(12) United States Patent
Dussud et al.

(10) Patent No.: US 7,987,215 B2
(45) Date of Patent: Jul. 26, 2011

(54) EFFICIENTLY MARKING OBJECTS WITH LARGE REFERENCE SETS

(75) Inventors: Patrick H. Dussud, Redmond, WA (US); Maoni Z. Stephens, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 629 days.

(21) Appl. No.: 12/107,483

(22) Filed: Apr. 22, 2008

(65) Prior Publication Data

US 2009/0265402 A1    Oct. 22, 2009

(51) Int. Cl.
G06F 12/02    (2006.01)
G06F 12/16    (2006.01)

(52) U.S. Cl. ...................................... 707/816
(58) Field of Classification Search .............. 707/861, 707/816
See application file for complete search history.

(56) References Cited

U.S. PATENT DOCUMENTS

| | | |
|---|---|---|
| 5,088,036 A | 2/1992 | Ellis et al. |
| 6,314,436 B1 | 11/2001 | Houldsworth |
| 6,393,439 B1 | 5/2002 | Houldsworth et al. |
| 6,453,463 B1 | 9/2002 | Chaudhry et al. |
| 6,662,274 B2 | 12/2003 | Subramoney et al. |
| 6,874,074 B1 | 3/2005 | Burton et al. |
| 6,925,637 B2 | 8/2005 | Thomas et al. |
| 7,092,978 B2 | 8/2006 | Garthwaite |
| 7,251,671 B2 | 7/2007 | Wu et al. |
| 7,310,655 B2* | 12/2007 | Dussud ................ 707/700 |
| 2002/0199065 A1 | 12/2002 | Subramoney et al. |
| 2003/0069905 A1 | 4/2003 | Dussud |
| 2003/0221047 A1 | 11/2003 | Ahmed |
| 2005/0289307 A1* | 12/2005 | Achanta et al. .......... 711/159 |
| 2007/0162527 A1 | 7/2007 | Wright et al. |
| 2007/0203960 A1 | 8/2007 | Guo |
| 2007/0255909 A1 | 11/2007 | Gschwind et al. |

OTHER PUBLICATIONS

Venstermans, Kris, et al., "Space-Efficient 64-bit Java Objects through Selective Typed Virtual Addressing", Code Generation and Optimization, 2006. International Symposium on Volume, Issue, Mar. 26-29, 2006 pp. 11 pages.
Campos, Alvaro e. ,et al., "Garbage Collection in Distributed EZ", Proceedings of the XIII International Conference of the Chilean Computer Science Society, La Serena, Chile, Oct. 1998, pp. 251-259.
Goetz, Brian, "Java theory and practice: Garbage collection in the HotSpot JVM", Nov. 25, 2003, 6 pages.
Garner, Robin, et al., "Effective Prefetch for Mark-Sweep Garbage Collection", ISMM'07, Oct. 21-22, 2007, Montreal, Quebec, Canada, 12 pages.

* cited by examiner

Primary Examiner — James Trujillo
Assistant Examiner — Amresh Singh
(74) Attorney, Agent, or Firm — Workman Nydegger (57) ABSTRACT

Adding references to objects to a mark stack. A limited number of references to objects referenced by an object with a large number of object references are added to the stack. An object is accessed. A determination is made that references in the object should be added to a mark stack using a reference in the mark stack to the object in conjunction with a pointer. The pointer is used to track which references in the object have been placed on the mark stack. A reference to the object on the mark stack is accessed. A pointer is initialized. A reference to another object referenced by the object is pushed onto the mark stack. The pointer is incremented. It is then determined that that more references should be pushed to the mark stack. Acts of pushing references onto the mark stack and incrementing the pointer are repeated.

23 Claims, 3 Drawing Sheets

EFFICIENTLY MARKING OBJECTS WITH LARGE REFERENCE SETS

BACKGROUND

Background and Relevant

In computer systems, there is often a need to manage memory. In particular, when objects are no longer used, it is useful to recover memory that was allocated for use with the objects. Some systems in use today use explicit memory management whereby the systems use a command to allocate memory and a corresponding command to free memory. For example, the C programming language includes a command "malloc" that can be used to allocate memory for an object and a command "free" that can be used to free memory that has been previously allocated. However, this type of memory allocation and de-allocation suffers from a number of drawbacks. In particular, free memory may be scattered throughout a memory structure. Additionally, this type of allocation and de-allocation allows for malicious attacks that can be used to compromise data. For example, a hacker can cause memory that has been allocated by one thread to be de-allocated such that a malicious thread can change or access data stored in the memory.

To combat these drawbacks, a system has been created using automatic memory management where the system includes garbage collectors for identifying objects that are no longer being used. Memory for the objects no longer being used can be identified as free memory such that the memory can be used for the creation of new objects. Typical garbage collection involves marking objects that can be reached beginning at a reference by a root and reclaiming memory for any objects that are not marked. Marking can occur by setting (or clearing) a flag (such as a single bit) in the object. After sweeping the heap, all flags for the objects are cleared (or set) such that subsequent garbage collection can take place.

To perform marking activities, a root provides a reference to one or more in use objects. These objects are visited and marked. References from these objects to other objects are then followed to the other objects. The other objects are marked and their references to still other objects are followed until all of the objects reachable from roots have been marked.

To facilitate marking, a mark stack may be employed. The mark stack allows references at one object to other objects to be entered on the mark stack. When the mark stack is limited in size, the mark stack may overflow. For example, if an object is visited that has 12 references and the mark stack only has 10 free entries, an overflow is determined to have occurred and references to the 12 referenced objects are not pushed on the mark stack.

Typically, when an overflow occurs, the heap including the objects is examined linearly by examining memory to determine if an object has been marked, and if it has been marked by following references in the object and marking the objects referenced by the references. While it may not be necessary to examine the entire heap as ranges of overflows can be implemented, as can be appreciated, this can nonetheless result in a time consuming and resource intensive marking process.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment disclosed herein is directed to a method practiced in a computing environment that includes application code that implements garbage collection functionality for reclaiming memory for use with new objects. The garbage collection functionality includes pushing object references onto a mark stack, such that objects referenced on the mark stack can be marked so as to prevent memory for the marked objects from being recycled for use with other objects instances. The method includes acts for adding references to objects to the mark stack in a manner that allows a limited number of references to objects referenced by an object with a large number of object references to be added to the stack. The method includes accessing an object. A determination is made that references in the object should be added to a mark stack using a reference in the mark stack to the object itself in conjunction with a pointer. The pointer is used to track which references in the object have been placed on the mark stack. A reference to the object on the mark stack is accessed. A pointer is initialized. A reference to another object referenced by the object is pushed onto the mark stack. The pointer is incremented. After pushing references to another object and incrementing the pointer, it is determined that that more references should be pushed to the mark stack, and as a result, acts of pushing references onto the mark stack and incrementing the pointer are repeated. References from the mark stack are processed until the reference to the object is in a position to be read from the mark stack. After processing references from the mark stack, a determination is made that more references from the object should be added to the mark stack, and as a result, acts of pushing references onto the mark stack and incrementing the pointer are repeated. A determination is made that no more references from the object should be added to the mark stack, and as a result, the reference in the mark stack to the object itself is popped from the mark stack.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

As noted above, it can be very expensive to process overflowed objects that overflow a mark stack during a garbage collector mark phase when all objects that fall in an overflow range have to be examined. Thus, some embodiments described herein implement functionality for reducing the likelihood of an overflow condition. For Example, this may be accomplished by recognizing when processing an object will result in a large number of references being pushed onto the mark stack. Using a reference to the object itself on the mark stack and pointers used to identify references in the object, the number of references on the mark stack at a given time can be reduced.

Figure 1:
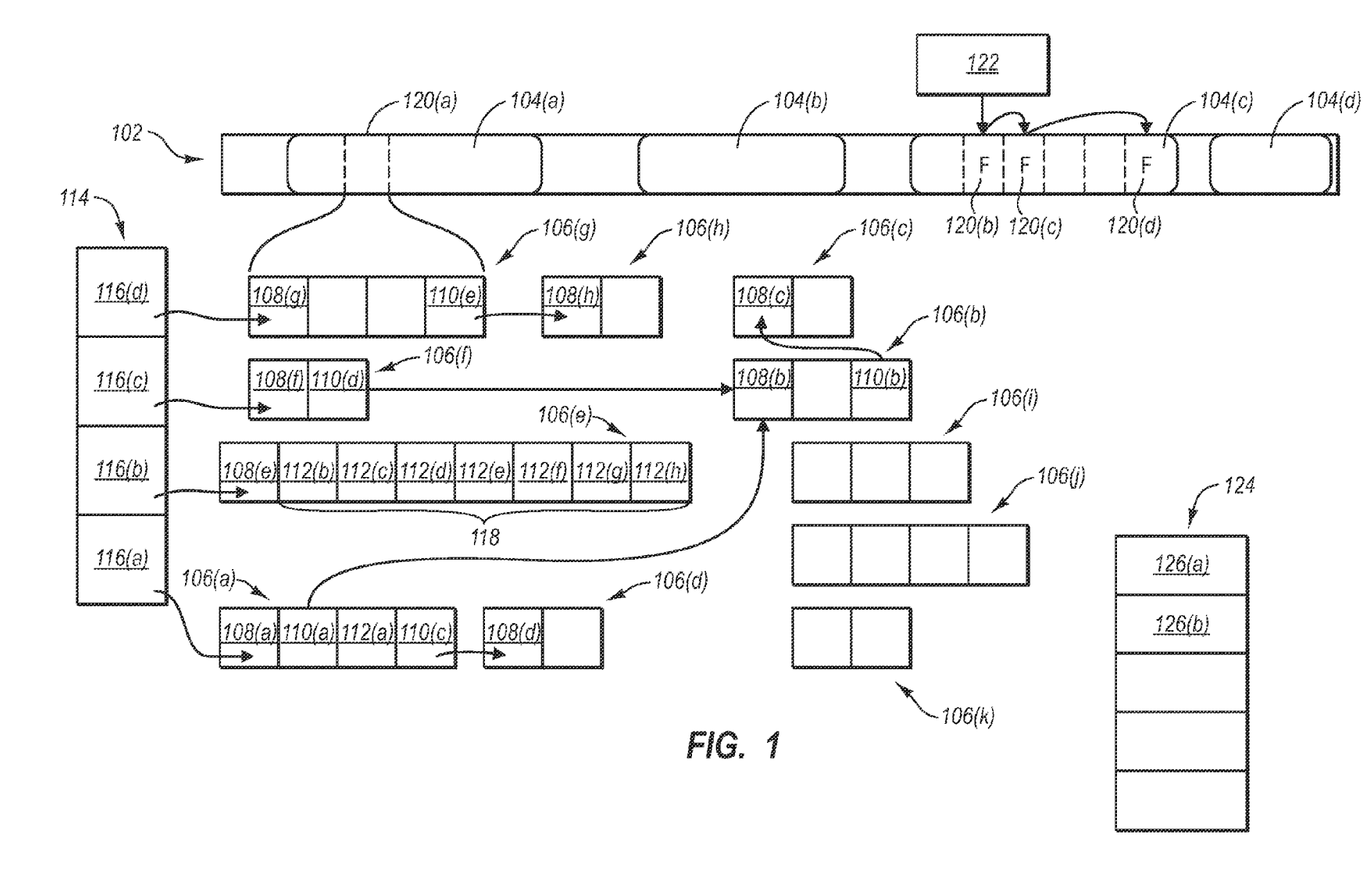
FIG. 1 illustrates garbage collection procedures.

Referring now to FIG. 1, examples of various garbage collection activities and allocation activities are illustrated. FIG. 1 illustrates a heap 102. The heap 102 comprises system memory, such as system RAM or other system memory that can be used to store objects. The heap 102 includes a number of segments 104. It should be noted that this point that references to designators in the Figures may be made generically or specifically when the Figures include more than one instance of an item illustrated. For example a generic reference may include a reference to segments 104 generically while a reference to a specific segment may include an additional designators appended to a reference such as is illustrated in FIG. 1 where the specific references to segments 104 include additional designators such that the specific references may be 104(a), 104(b), 104(c), and 104(d).

A segment 104 is a portion of the heap 102 that has been allocated by an operating system to store objects in memory spaces 120 for code running in the operating system environment. FIG. 1 further illustrates a number of objects 106 that may be stored in the segments 104.

An object 106 may include additional portions that vary from object to object. For example, an object 106 may include a header 108 that includes information about the object 106 including such information as class type, size, etc. The object 106 may include references 110 to other objects 106. Additionally an object 106 may include data members 112. Data members 112 may include raw low level data, such as integers, Booleans, floating point numbers, characters, and strings.

Illustrating now garbage collection marking and reclamation of dead space activities, FIG. 1 illustrates a root 114. The root 114 includes references to objects that are currently being used. Prior to mapping objects and object references, a snapshot of the state of a system may be taken to identify object states at a given time. The objects are then released so that other user threads can interact with the objects. Garbage collection activities are performed on the snapshot so as to allow the other activities to continue interaction with the objects. To perform garbage collection, a reference in a root entry may be followed to an object. For example, the root reference 116(a) points to an object 106(a). In the example illustrated, the object 106(a) can then be marked to indicate that the object 106(a) is currently in use. In one embodiment, marking an object 106 as being currently in use may include setting a bit or clearing a bit in the header 108 of an object 106. Thus, in the example illustrated, a bit set aside for the purpose of marking an object may be set in the header 108(a) of object 106(a) to mark the object 106(a).

Once an object 106 is accessed due to a reference by a root reference 116, then other references 110 in the object can be followed to mark other objects. For example, the reference 110(a) points to an object 106(b). Following the reference 110(a) allows the object 106(b) to be marked by setting a bit in the header 108(b) to indicate that the object 106(b) is currently in use. References 110 in the object 106(b) can be followed to find other objects 106 as well. For example, the object 106(b) includes a reference 110(b) that points to an object 106(c). Following the reference 110(b) to the object 106(c) allows the object 106(c) to be marked as being currently in use by setting a bit in the header 108(c).

Because the object 106(c) does not include references 110 to any other objects, Processing may then return to object 106(a) to follow the reference 110(c) to the object 106(d). Object 106(d) is then marked as being currently in use by setting a bit in the header 108(d). Because the object 106(d) does not include any references 110, processing can return to the root 114 to examine the root reference 116(b) which references an object 106(e). The object 106(e) can then be marked, by setting a bit in the header 108(d), as being currently in use. In this particular example, the object 106(e) includes an array 118 of data members 112(b)-112(h) such that the object 106(e) does not include any references 110 to other objects 106. Processing therefore returns to the root 114 to examine the root reference 116(c). The root reference 116(c) points to an object 106(f). The object 106(f) is marked by setting a bit in the header 108(f) to indicate that the object 106(f) is in use.

The object 106(f) includes a reference 110(d). The reference 110(d) points to an object 106(b). At this point, a determination is made that the object 106(b) has already been marked and thus processing on this particular chain such that processing is returned to the root 114. In particular, it should be noted that processing may include checking a mark bit in a header 108 before marking an object 106. Thus, objects 106 that have already been marked can be discovered so as to economize system resources when performing marking operations.

At the root 114, a root reference 116(d) is referenced which points to an object 106(g). The object 106(g) is marked by setting a bit in the header 108(g). The object 106(g) includes a reference 110(e) which points to an object 106(h). The object 106(h) is marked by setting a bit in the header 108(h) to indicate that the object 106(h).

At this point, because the root 114 includes no further root references 116, and all of the objects referenced by root references 116 or references 110 in other previously referenced objects 106 have been followed, an operation to reclaim dead space can be performed. It will be noted that FIG. 1 illustrates three objects object 106(i) object 106(j) and object 106(k) that have not been marked and are thus eligible to have their memory recovered for use for other objects. In one embodiment, this may be accomplished by marking memory space in segments 104 as free space. This is illustrated in segment 104(c) where memory spaces 120(b) 120(c) and 120(d) have been marked as free space.

While the example illustrated above has shown that objects 106 are traced and marked directly, marking may include the use of a mark stack 124. In particular, when an object 106 is reached due to following a reference, all of that objects references are pushed on the mark stack 124 such that the mark stack 124 can be used to ensure that all of the appropriate mapping takes place.

For example, in the example illustrated in FIG. 1, following the root reference 116(a) to the object 106(a) results in references to the objects 106(b) and 106(d) referenced by 110(a) and 110(c) respectively being pushed onto the mark stack 124 as mark stack slots 126(b) and 126(a) respectively. The slot 126(*a*) in the mark stack 124 to object 106(*b*) is then popped from the mark stack 124 to map to the object 106(*b*). When object 106(*b*) is mapped to, then a reference to object 106(*c*) is pushed to the mark stack 124 as slot 126(*a*) due to the reference 110(*b*). The slot 126(*a*) in the mark stack to object 106(*c*) is popped from the mark stack, where after it is determined that object 106(*c*) has no references. Thereafter, the slot 126(*a*) to object 106(*d*) is popped from the mark stack 124 where it is determined that object 106(*d*) has no references. Because the mark stack 124 is empty at this point, processing continues at the root reference 116(*b*) in the same fashion described above. Additionally, processing may further continue with root references 116(*c*) and 116(*d*) until all of the in use objects have been marked.

As can be imagined, when the mark stack 124 is limited in size, or limited in the amount that the mark stack 124 can grow, overflows of the mark stack 124 can occur. For example, consider a case where a mark stack 124 has 10 free entries, but a reached object 106 has 12 references. This condition can be detected and an indicator that the mark stack has overflowed can be provided. When this occurs, some systems look at and mark objects directly in the heap 102 by linear examination of the heap 102. For example, a garbage collector thread may begin examining a segment 104. When overflow condition occurs, an object is discovered by linear examination beginning at a segment 104. A determination is made as to whether or not the object is marked. If the object is marked, then the garbage collector traces through the references of the object. If the object is not marked, the garbage collector jumps past the object (by jumping memory the size of the object as indicated by an object size) to begin examining further portions of the segment 104. This linear examination may be computationally costly.

Thus, some embodiments described herein implement functionality for recognizing when an object includes a large number of references, pushing a reference to the object itself on the mark stack, and using a pointer to identify references in the object. Using this arrangement, a limited number of references from the object may be pushed onto the mark stack at a given opportunity, thus reducing the likelihood of a mark stack overflow.

Figure 2A:
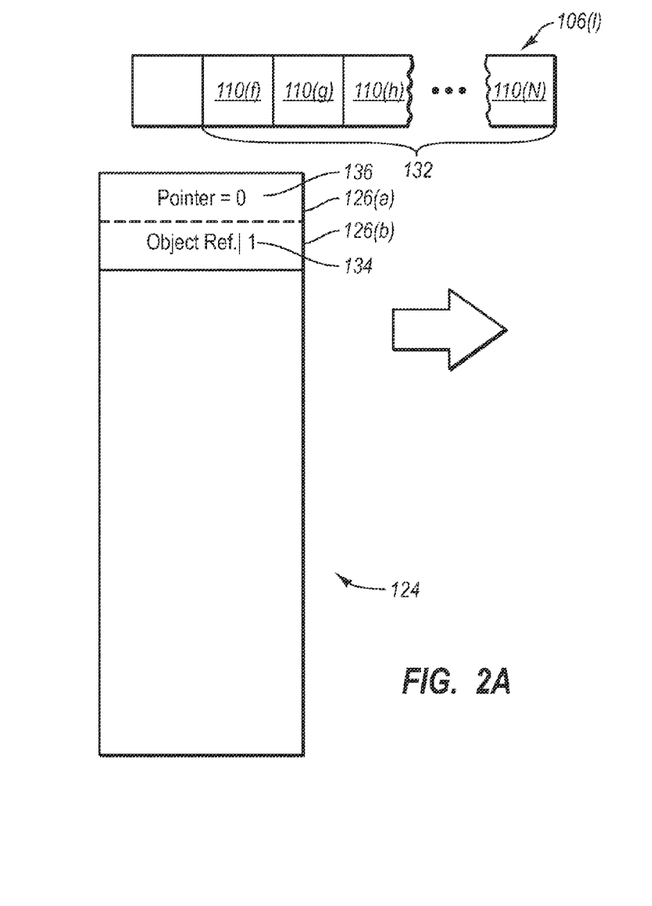
FIGS. 2A and 2B illustrate additional garbage collection procedures related to objects with multiple references.
Figure 2B:
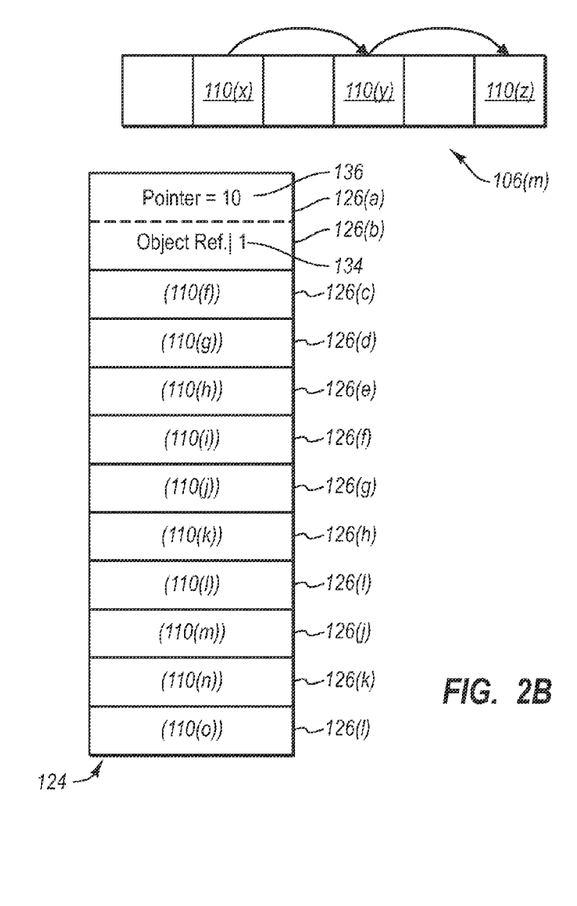

An example is illustrated in FIGS. 2A and 2B. FIG. 2A illustrates the mark stack 124. FIG. 2A further illustrates an object 106(1). The object 106(1) includes an array 132 of references 110(*f*) through 110(N), where N is a given number, the number being the number of references 110 in the array 132. A determination may be made that processing the object 106(1) should include processing less than all of the references in the array 132 of the object 106(1). This may be done in a number of different ways. For example, one embodiment may determine that the array 132 includes a number of references above a predetermined threshold. Alternatively, a determination may be made that the array 132 includes a number of references that will cause of the mark stack 124 to overflow based on the number of available slots for references in the marks stack 124.

As is illustrated in FIG. 2A, a pointer 136 is pushed to the mark stack 124 at slot 126(*a*). Additionally, an entry is made into the mark stack 124 at slot 126(*b*). The entry includes an entry 134 based on an object reference and a pointer 136. In the present example, the entry 134 based on the object reference includes a reference to the object 106(1) ORed with 1 to make the value of the entry 134 based on the object reference 134 an odd number. The use of a odd number is done because ordinarily references to real object addresses are always even numbers. Thus, use of an odd number can be used as an effective indication that a reference and pointer are being used. The pointer 136 includes an indicator that can be used to determine which references 110 from the object 106(1) have been pushed on the mark stack 124. In the example illustrated, the pointer 136 is initialized at 0 and is implemented as an offset from the object reference. Other embodiments may be implemented where the pointer points to a reference in an object directly.

Embodiments may be implemented to add a number of references from an object 106 to the mark stack 124. In the present example a number (M) of references are added to the mark stack. The number of references may be a predetermined number of references, a number of references that will fill the mark stack 124, or some other number of references. In the example illustrated, the number of references is predetermined to be 10 (i.e. M=10). Thus, in this example, ten of the references 110 from the array 132 are added to the mark stack 124. While FIG. 2A illustrates the mark stack prior to the references from the object 106(1) being added to the mark stack 124, FIG. 2B illustrates the mark stack after the 10 references have been pushed to the mark stack 124.

The operations that are performed to obtain the state shown in FIG. 2B include pushing object references from the object 106(1) to the mark stack and updating the pointer 136 when object references are pushed to the mark stack 124. In the example illustrated, object references are pushed to mark stack slots after slots 126(*a*) and 126(*b*) where the pointer and the where references are already in the mark stack 124. Thus, in this example, object references are pushed to slots 126(*c*) through 126(1). In some embodiments, the pointer can be updated as each reference is pushed to the mark stack. Alternatively, the pointer 136 can be updated when all M references have been pushed to the mark stack.

References from the mark stack 124 can then be processed and popped from the mark stack 124 as previously described. When a sufficient number of references have been popped from the mark stack 124 such that the entry 134 based on the object reference is in a position to be read from the mark stack 124, then a determination can be made that additional references from the object 106(1) should be added to the mark stack 124. This may be done based on determining that the entry 134 based on the object reference is a specialized type of reference. In one embodiment, this may be accomplished by the use of flags or other indicators. In particular, and one embodiment, typical references to objects in a mark stack 124 are based on even addresses due to the typical memory requirements for object references. Thus in one embodiment, the specialized indicator may be created by performing an operation, such as an OR with "1" on the object reference to make the entry 134 based on the object reference an odd number.

The following discussion now refers to a number of methods and method acts that may be performed. It should be noted, that although the method acts may be discussed in a certain order, no particular ordering is necessarily required unless specifically stated, or required because an act is dependent on another act being completed prior to the act being performed. Indeed, ordering can be changed for many of the elements illustrated without affecting the overall functionality.

Figure 3:
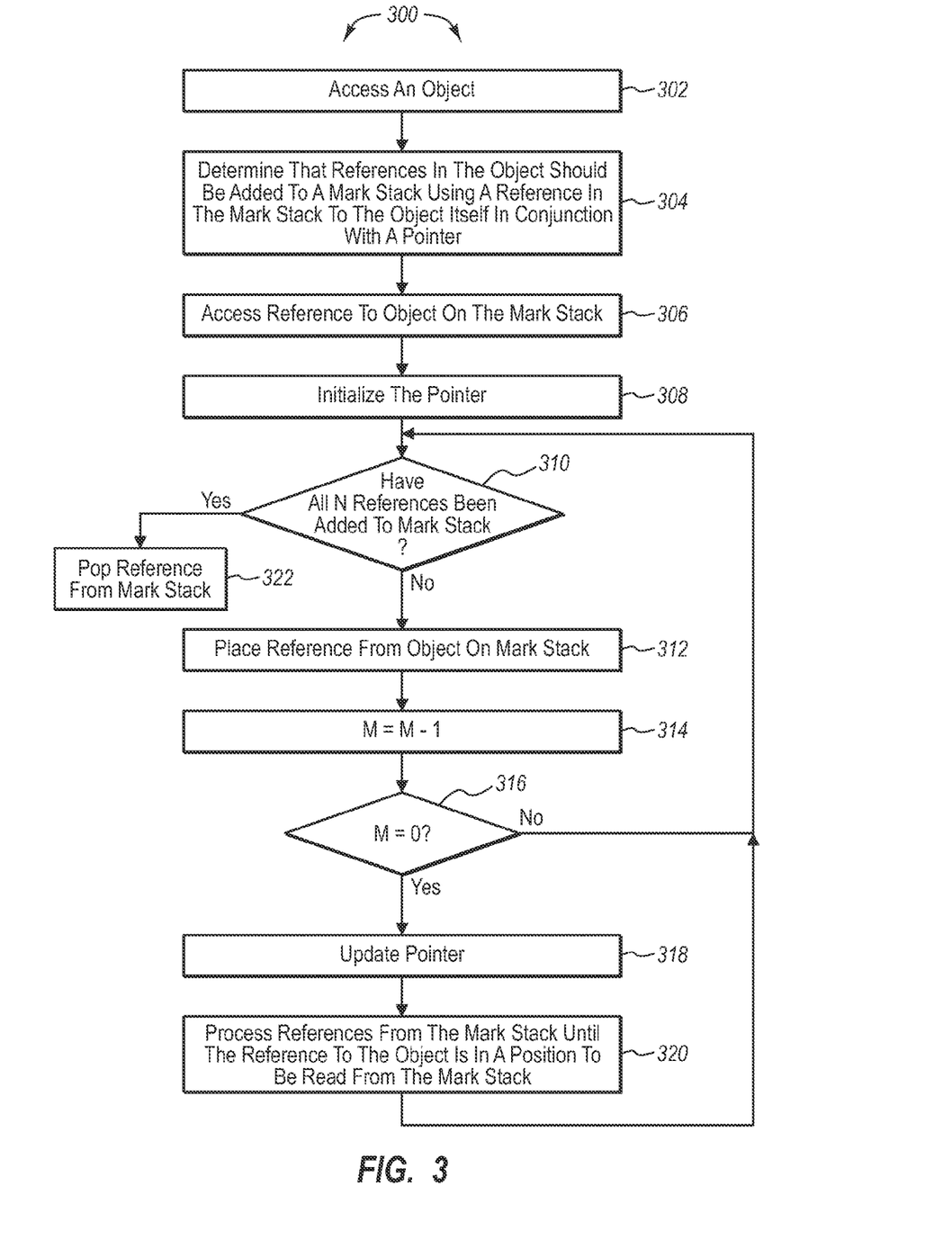
FIG. 3 illustrates a method of performing garbage collection procedures.

Referring now to FIG. 3, a method 300 is illustrated illustrating a number of activities that may be performed. The method 300 is illustrated with reference to elements illustrated in FIGS. 1, 2A, and 2B, however it should be appreciated that other elements may be used, and that the examples or only illustrative. The method 300 may be practiced in a computing environment including application code that implements garbage collection functionality for reclaiming memory for use with new objects. The garbage collection functionality includes pushing object references onto a mark stack 124, such that objects 106 referenced on the mark stack can be marked so as to prevent memory for the marked objects 106 from being recycled for use with other objects instances, The method includes acts for adding references to objects 106 to the mark stack 124 in a manner that allows a limited number of references 110 to objects 106 referenced by an object 106 with a large number of object references 110 to be added to the mark stack 124. The method 300 includes accessing an object (act 302). For example, an object 106(1) (FIG. 2A) may be referenced as a result of accessing a root reference 126.

The method 300 further includes determining that references 110 in the object 106(1) should be added to a mark stack using a reference (134) in the mark stack to the object (1061) itself in conjunction with a pointer (136) (act 304). The pointer (136) is used to track which references (110) in the object have been pushed on the mark stack (124). The pointer 136 may be included in the mark stack 124 with the reference 134 to the object 106(1), or alternatively the pointer 136 may be stored in a separate location separate from the mark stack 124.

The method 300 may be performed where determining that references 110 in the object 106(1) should be added to a mark stack 124 using a reference 134 in the mark stack 124 to the object 106(1) itself in conjunction with a pointer 136 (act 304) includes determining that the object 106(1) includes an array 132 of references. As illustrated in FIG. 2A, the array 132 includes a number of elements, where the elements are references 110 to other objects 106. The determination of act 302 may be performed strictly on the basis of the object 106(1) including an array 132, based on the size of the array 132 or other factors.

In an alternative embodiment, determining that references 110 in the object (in this example object 106(m)) should be added to a mark stack 124 using a reference 134 in the mark stack 124 to the object 106(m) itself in conjunction with a pointer 136 (act 304) may include determining that the object 106(m) includes at least a predetermined number of references that can obtain a next reference from a given reference site. For example, FIG. 2B illustrates an object 106(m) where next references can be determined from previous references. For example, reference 110(y) can be determined from reference 110(x). Similarly, reference 110(z) can be determined from reference 110(y). When a given number of references can be determined in this fashion, a decision may be made to perform act 304.

The method 300 further includes accessing a reference to the object 106(1) on the mark stack 124 (act 306). This may include accessing a form of the reference, such as the entry 134, adding an entry 134 based on the reference to the object 106(1) to the mark stack 124 if the reference or and entry 134 based on the reference is not already there, modifying the reference to the object 106(1) if the reference to the object 106(1) is already on the mark stack 124, and/or other activities. In some embodiments, accessing the reference to the object 106(1) on the mark stack 124 (act 306) may include setting a flag in the mark stack 124 corresponding to the reference to the object in the mark stack 124 to indicate that a pointer 136 should be referenced in conjunction with reference to the reference to the object to add references 110 from the object 106(1) to the mark stack 124. In one particular version of this embodiment, the flag may include a change to the reference to the object that causes the an entry 134 based on the reference to the object to reference an odd numbered address. Other flags may also be used, such as flags in headers, separate tables, registers, etc.

The method 300 further includes initializing a pointer 136 (act 308). For example, FIG. 2A illustrates a pointer 136 that has been initialized to 0. this may be done when the pointer represents an offset from the reference. In other embodiments, the pointer may be set to the value of the reference.

Skipping act 310 for the present time, the method 300 further includes pushing a reference 110 from the object 106(1) onto the mark stack 124 (act 312). For example, this may include pushing a reference to another object 106 referenced by the object 106(1) onto the mark stack 124. For example, FIG. 2A illustrates an array 132 of references 110. A reference 110 to an object 106 referenced by one of the references 110 may be pushed onto the mark stack 124.

The method 300 further includes decrementing a counter as illustrated by M=M−1 (act 314). This allows for counting the number of references added to the mark stack 124 to ensure that a given number of references are added to the mark stack 124.

The method 300 further includes an act of determining if more references 110 from the object 106(1) should be added to the mark stack 124, as illustrated by decision M=0 (act 316). For example, the method 300 may include repeating act 312 a number of times or a predetermined number of times (i.e. M times) to add a number of references or a predetermined number of references to the mark stack 124. For example, it has been discovered that adding 10 references to the mark stack 124 is particularly useful. The number may also be as few as 1 time. In other embodiments, rather than repeating act 312 a predetermined number of times, repeating act 312 may be performed until the mark stack 124 is full. The mark stack 124 being full may also include the mark stack 124 being unable to be expanded any further. Embodiments may also repeat act 312 until there are no more references 110 left in an object 106(1) that should be pushed on the mark stack. This is illustrated by act 310 which illustrates a determination being made that all N references 110 from the array 132 have been added to the mark stack 124.

Returning now to the decision at 316, after it has been determined that M=0, M may be reset to the predetermined number, in this example, 10, such that additional looping and performance of acts 312 and 314 can be performed to process additional reference 110 from the object 106(1).

The method 300 may further include after the all of the predetermined number of references have been added to the mark stack 124 (e.g. after M has been decremented to 0), the pointer 136 is updated. This may occur, in one embodiment by adding M to the value of the pointer. For example, FIG. 2B illustrates that the pointer is updated from a value of 0 to a value of 10. In this example, M=10. The update to the pointer simply adds 0+10. As noted, updates to the pointer may also occur by incrementing the pointer 136 after each reference 110 is pushed to the mark stack 124.

The method 300 further includes processing each of the references in the predetermined references and popping each of the references in the predetermined references from the mark stack 124 until the reference 134 in the mark stack 124 to the object 106(1) itself is in a position to be read from the mark stack 124 (act 320). Processing references may include following references in referenced objects and adding additional references to the mark stack as appropriate. For example, FIG. 1 illustrates processing reference 110(a) results in following the reference 110(a) to the object 106(b) and adding the object 106(b) to the mark stack 124.

Returning now to act 310, the method 300 further illustrates that a determination can be made that more references from the object 106(1) should be added to the mark stack by determining if all N (where N is the N illustrated in the reference 110(N) of object 106(1) for this example) references have been added to the mark stack 124 (act 318). For example, it may be determined that there are more references in the object 106(1) itself that should be added to the mark stack. As such, more references may be added to the mark stack 124. For example, processing may return to act 312 such that acts 312 and 314 may be repeated the predetermined number of times to add an additional predetermined number of references to the mark stack 124. The pointer 136 can be used to determine where in the array 132 of the object 106(1) additional references from the object 106(1) should be processed as described. Alternatively, a determination may be made that all of the references from the object 106(1) have been pushed onto the mark stack 124. In this case, the method 300 illustrates determining that entries for all references in the object have been added to the mark stack and as a result, popping the reference 134 in the mark stack 124 to the object 106(1) itself and the pointer 136 (if it is included on the mark stack 124) from the mark stack 124 (act 322). In one embodiment, this may be done by setting the entry 134 to 0 and the pointer 136 to 0 such that they are popped from the mark stack 124 in the ordinary performance of the various garbage collection activities.

Embodiments herein may comprise a special purpose or general-purpose computer including various computer hardware, as discussed in greater detail below.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment including application code that implements garbage collection functionality for reclaiming memory, wherein the garbage collection functionality includes pushing object references onto a mark stack, a method of adding references to objects to the mark stack in a manner that allows a limited number of references to objects referenced by an object with a large number of object references to be added to the stack, the method comprising:
    (a) accessing an object;
    (b) determining that the object comprises a plurality of references to one or more other objects that would exceed available space in a mark stack if all of the references were pushed onto the mark stack, and that only a subset of the references in the object should be added to the mark stack;
    (c) pushing a reference to the object onto the mark stack in conjunction with a pointer, the pointer being used to track which references in the object have been pushed on the mark stack, the mark stack being configured to allow for marking of objects pushed on the marked stack to prevent memory for the objects referenced on the mark stack from being reclaimed for other objects;
    (d) accessing the reference to the object on the mark stack;
    (e) initializing the pointer;
    (f) pushing one or more of the references in the object onto the mark stack; and
    (g) updating the pointer to track which references in the object have been pushed on the mark stack.

2. The method of claim 1, wherein act (f) is performed so as to add a predetermined number of references to the mark stack.

3. The method of claim 2, further comprising, after the all of the predetermined number of references have been added to the mark stack, processing each of the references in the predetermined references and popping each of the references in the predetermined references from the mark stack until the reference to the object is in a position to be read from the mark stack.

4. The method of claim 3, further comprising, once the reference to the object is in a position to be read from the mark stack, performing act (f) so as to add the predetermined number of different references to the mark stack.

5. The method of claim 3, further comprising:
    determining that entries for all references in the object have been added to the mark stack; and
    as a result, popping the reference to the object from the mark stack.

6. The method of claim 2, wherein the predetermined number of times is less than or equal to 10 times.

7. The method of claim 1, further comprising performing act (f) until the mark stack is full.

8. The method of claim 1, wherein the pointer is included in the mark stack with the reference to the object.

9. The method of claim 1, wherein pushing the reference to the object on the mark stack comprises setting a flag in the mark stack corresponding to the reference to the object to indicate that the pointer should be referenced in conjunction with the reference to the object to add references from the object to the mark stack.

10. The method of claim 9, wherein the flag comprises a change to the reference to the object that causes the reference to the object to comprise an odd number.

11. The method of claim 1, wherein determining that the object comprises a plurality of references comprises determining that the object comprises an array of references.

12. The method of claim 1, wherein at least a predetermined number of references can obtain a next reference from a given reference site.

13. The method of claim 1, wherein updating the pointer is performed after pushing one or more of the references in the object onto the mark stack a predetermined number of times, the step of updating the pointer comprising incrementing the pointer, and the method further comprising:
processing and popping references from the mark stack until the reference to the object is in a position to be read from the mark stack.

14. The method of claim 13, further comprising after the reference to the object is in a position to be read from the mark stack, pushing one or more additional references in the object onto the mark stack a predetermined number of times and incrementing the pointer.

15. The method of claim 13, further comprising
determining that entries for all references in the object have been added to the mark stack; and
as a result, popping the reference to the object from the mark stack.

16. The method of claim 13, wherein in the pointer is included with the reference to the object.

17. The method of claim 13, wherein in the pointer is stored external to the mark stack, and a flag is associated with the reference to the object to indicate that the external pointer should be referenced.

18. The method of claim 17, wherein the flag comprises the reference to the object being a reference to an odd numbered address.

19. The method of claim 1, further comprising:
(h) processing references from the mark stack until the reference to the object is in a position to be read from the mark stack;
(i) after processing references from the mark stack, determining that more references from the object should be added to the mark stack, and as a result, repeating acts (e), (f), and (g);
(j) determining that no more references from in the object should be added to the mark stack, and as a result, popping the reference to the object from the mark stack.

20. The method of claim 19, wherein the pointer is included with the reference to the object.

21. The method of claim 1, wherein the reference to the object comprises a derived reference derived from the reference to the object.

22. One or more computer storage devices having stored thereon computer-executable instructions which, when executed by at least one processing device, perform a method for adding references to objects to a mark stack in a manner that allows a limited number of references to objects referenced by an object with a large number of object references to be added to the mark stack, the method comprising:
(a) accessing an object;
(b) determining that the object comprises a plurality of references to one or more other objects that would exceed available space in a mark stack if all of the references were pushed onto the mark stack, and that only a subset of the references in the object should be added to the mark stack;
(c) pushing a reference to the object onto the mark stack in conjunction with a pointer, the pointer being used to track which references in the object have been pushed on the mark stack, the mark stack being configured to allow for marking of objects pushed on the marked stack to prevent memory for the objects referenced on the mark stack from being reclaimed for other objects;
(d) accessing the reference to the object on the mark stack;
(e) initializing the pointer;
(f) pushing one or more of the references in the object onto the mark stack; and
(g) updating the pointer to track which references in the object have been pushed on the mark stack.

23. A computer system, comprising:
at least one processing device; and
one or more computer storage devices having stored thereon computer-executable instructions which, when executed by the at least one processing device, perform a method for adding references to objects to a mark stack in a manner that allows a limited number of references to objects referenced by an object with a large number of object references to be added to the mark stack, the method comprising:
(a) accessing an object;
(b) determining that the object comprises a plurality of references to one or more other objects that would exceed available space in a mark stack if all of the references were pushed onto the mark stack, and that only a subset of the references in the object should be added to the mark stack;
(c) pushing a reference to the object onto the mark stack in conjunction with a pointer, the pointer being used to track which references in the object have been pushed on the mark stack, the mark stack being configured to allow for marking of objects pushed on the marked stack to prevent memory for the objects referenced on the mark stack from being reclaimed for other objects;
(d) accessing the reference to the object on the mark stack;
(e) initializing the pointer;
(f) pushing one or more of the references in the object onto the mark stack; and
(g) updating the pointer to track which references in the object have been pushed on the mark stack.

* * * * *

UNITED STATES PATENT AND TRADEMARK OFFICE
CERTIFICATE OF CORRECTION

| | | |
|---|---|---|
| PATENT NO. | : 7,987,215 B2 | Page 1 of 1 |
| APPLICATION NO. | : 12/107483 | |
| DATED | : July 26, 2011 | |
| INVENTOR(S) | : Patrick H. Dussud et al. | |

It is certified that error appears in the above-identified patent and that said Letters Patent is hereby corrected as shown below:

In column 11, line 39, in Claim 19, after "references" delete "from".

Signed and Sealed this
Thirtieth Day of August, 2011

David J. Kappos
*Director of the United States Patent and Trademark Office*